March 27, 1962     A. M. MARKS     3,026,763
LIGHT POLARIZING DEVICE
Filed May 8, 1957
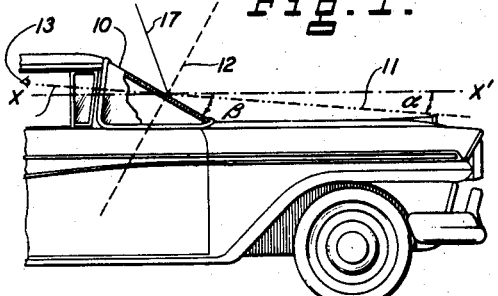
Fig. 1.
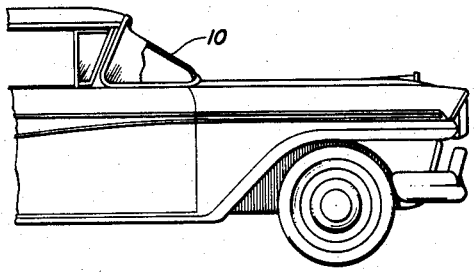
Fig. 6.
Fig. 2.
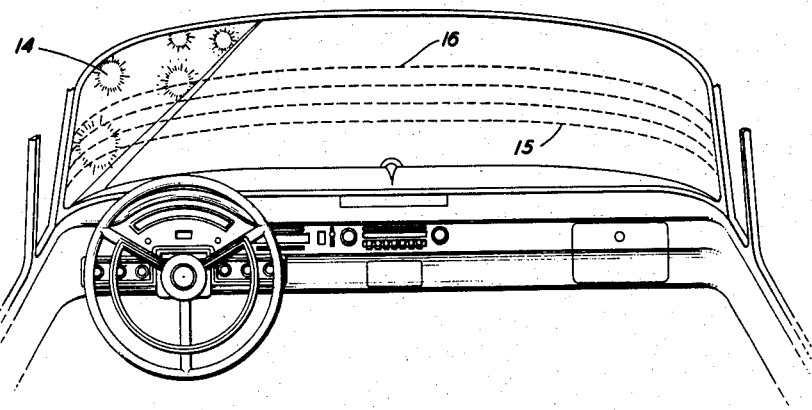
Fig. 3.
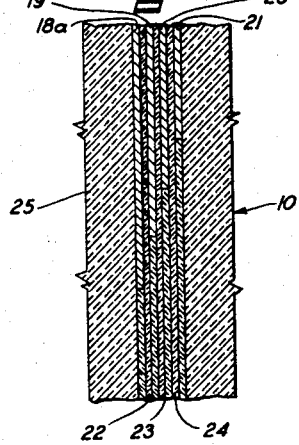
Fig. 5.
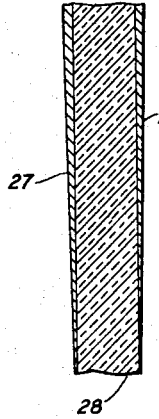
Fig. 4.
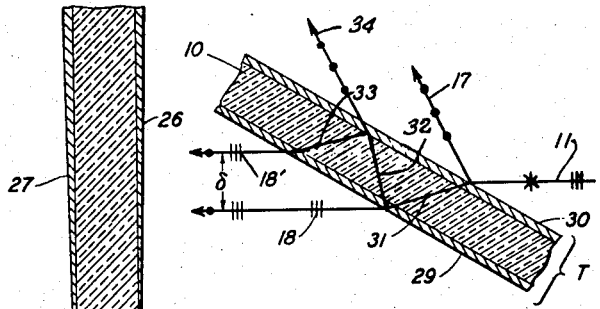
INVENTOR.
ALVIN M. MARKS
BY Albert F. Krouman
ATTORNEY

United States Patent Office 3,026,763
Patented Mar. 27, 1962

3,026,763
LIGHT POLARIZING DEVICE
Alvin M. Marks, 149—61 Powells Cove Blvd., Whitestone, N.Y., assignor, by mesne assignments, to said Alvin M. Marks and Mortimer M. Marks, Whitestone, N.Y.
Filed May 8, 1957, Ser. No. 657,865
4 Claims. (Cl. 88—1)

This invention relates to vehicle windshields capable of eliminating the glare through the use of light polarization. This application is a continuation-in-part of an application entitled "Glare Eliminating Optical System," filed November 14, 1952, Serial No. 320,440, by Alvin M. Marks, now Patent No. 2,887,566.

A practical operative glare eliminating windshield must be so constructed that it will function without inconvenience or detriment to the driver and his safe operation of the vehicle. In addition to considerations of safety a glare eliminating windshield must be so constructed that it will stand the rigorous conditions to which it is subjected on the vehicle.

Accordingly, it is an object of the present invention to provide a glare eliminating vehicle windshield which will be satisfactory for both day and night use.

Another object is to provide a windshield which will permit maximum visibility at all times.

A further object is to provide a compact structure capable of polarizing light incident thereon.

An object is to provide a glare eliminating structure which will stand exposure to sunlight, heat and cold.

Another object is to provide a novel multi-layer light polarizing structure capable of transmitting images with good resolution and without color distortion.

A still further object is to provide a windshield which will lend itself to modern vehicle design.

A feature is its use of the multi-layer light polarizing principle.

Another feature of the present invention is its use of a graduated density polarizing construction.

A further feature is its use of variable thickness in the multi-layer construction to provide graduate density effect.

Another feature is its use of the small number of layers to achieve a high degree of polarization.

The invention consists of the construction, combination and arrangement of parts, as herein illustrated, described and claimed.

In the accompanying drawings, forming a part hereof, are illustrated two forms of embodiment of the invention and in which:

FIGURE 1 is a longitudinal section of a portion of a vehicle showing a light polarizing glare eliminating windshield made in accordance with the present invention.

FIGURE 2 is a view in rear elevation of the windshield shown in FIGURE 1.

FIGURE 3 is a fragmentary cross-section of a multi-layer glare eliminating windshield made in accordance with the present invention.

FIGURE 4 is a fragmentary view of the multi-layer light polarizing windshield showing the paths of light as they traverse the structure.

FIGURE 5 illustrates another type of multi-layer polarizer made in accordance with the present invention.

FIGURE 6 is a longitudinal view of another form of the windshield made in accordance with the present invention.

Referring to the drawings and specifically to FIGURE 1, 10 indicates a windshield disposed at a suitable angle $\beta$ with respect to the horizontal axis indicated by X—X'. The angle $\alpha$ corresponds to Brewster's angle for the material of which the windshield is made for the incident ray 11 and a line 12 drawn normal to the surface of the windshield. At this angle maximum transmission and polarization of the incident ray 11 is achieved.

Modern vehicles lend themselves to windshield inclination of between 20°–30° to the horizontal, this enables the line of vision to approximate the Brewster's angle required to produce maximum polarization. It is within the purview of the present invention to provide a windshield having a somewhat S-shaped cross-sectional curve as illustrated in FIGURE 6. The S-shaped construction will foreshorten the windshield while still providing the required Brewster's angle, $\alpha$. The angle which the incident ray 11 makes with the horizontal in its travel towards the eye 13 of the observer is indicated by $\alpha$ in FIGURE 1. This angle $\alpha$ corresponds to the average direction of approach to the horizontal of incident light from various objects to the eye 13 of the observer. Where necessary, the height of the observer's eye 13 can be adjusted by presently used seat raising, lowering, mechanisms to correspond with the proper elevation to bring the graduated polarizing area into line with the optimum path of the ray 11.

When driving at night, under difficult conditions, it is important that the lower portion of the windshield particularly be completely unobstructed so that the slightest amount of light coming from objects can be picked up and noticed by the driver. Unless maximum visibility is available under such conditions the safety of pedestrians and the drivers ability to avoid small objects in his path may be sacrificed. Polarizing windshields in accordance with the present invention, therefore, are made with a varying density, the density being a maximum, starting at the top and decreasing toward the bottom of the windshield. In addition, the areas of polarization are curved as shown in FIGURE 2 so that they will provide the most efficient protection from the average approach pattern of headlights of oncoming cars indicated by the small circles 14 in FIGURE 2. It will be observed from examination of FIGURE 2 in which a road is illustrated with a line of oncoming lights 14, that the approach pattern of the headlights is down and to the left of the driver. By making the gradient density portion of the windshield curved downwardly at the left of the windshield and curving the gradient density portions of the windshield upward to the right of the driver, maximum visibility downward and to the right can be provided while at the same time shielding him from the headlights which pass downwardly and to the left. In addition, the headlights 14 in the distance or directly in front of the observer are above his line of sight. The more distant headlights are therefore viewed through the upper or denser portion of the polarizing windshield. The closer headlights are viewed through the lower portion of the windshield but are substantially to the left of the viewer and begin to enter his peripheral vision and so be less annoying, thus permitting maximum visibility for the driver, towards the right of the windshield. It is to be understood that the dotted lines in FIGURE 2 represent various layers of the multi-layer polarizing structure with the greatest density at the top of the windshield and each successive line indicating an area of lesser density and lower percentage of polarization of the light. Thus the area indicated by the line 15 in FIGURE 2, is one of maximum transmission and no polarization whereas the area indicated by the line 16 in FIGURE 2 is one of maximum polarization and minimum transmission. In the area between 15 and 16 there is provided a gradient density which is achieved by methods hereinafter described in connection with FIGURES 3 and 5. For very large windshields it may not be necessary to carry the polarization area to the top of the windshield and it will rarely be necessary to carry the polarization below the point indicated by line 15, in FIGURE 2. Thus a fairly narrow band can be provided across the windshield wherein the glare eliminating structure of the windshield is incorporated.

It has been determined that the specular component of light coming from roads and horizontal surfaces normally known as road glare is light polarized in a vertical plane as indicated by the vertical parallel lines on rays 11, in FIGURES 1 and 4. When this vertically polarized component of the light strikes the multi-layer windshield 10, it is reflected as ray 17 in FIGURES 1 and 4. The portion of the transmitted light ray 18 which traverses the windshield is substantially horizontally polarized containing all of the visual detail devoid of the specular surface glare. The transmitted light ray is also indicated at 18 in FIGURES 1 and 4.

In order to have a system which is compatible for daylight as well as nighttime use, it is necessary to provide oncoming headlights with structures which will produce light polarized in a vertical plane. It will be seen that the windshield 10, will be capable of eliminating headlight glare as well as road glare without any change in the disposition in the windshield 10. Headlight structures suitable for the above purpose should be of the reflux high efficiency, high transmission type such as has been described in my co-pending applications Serial No. 472,-739, filed December 2, 1954, now U.S. Patent No. 2,810,-324, issued October 22, 1957, and Serial No. 320,440, filed November 14, 1952, now U.S. Patent No. 2,887,566, issued May 19, 1959.

Referring to FIGURE 3, there is shown a gradient density multi-layer polarizer according to the present invention. In the structure shown in FIGURE 3, layers 18a, 19, 20 and 21 may comprise a suitable high index transparent material such as titanium dioxide, zinc sulphide, selenium or other high index material suitable for this purpose. Between the high index layers there are layers of low index material indicated at 22, 23, 24. The low index layers may be of glass or any other transparent material. The alternate high and low index structure shown in FIGURE 3 may be deposited on one surface of the windshield glass 25. It will be observed from examination of FIGURE 3 that the layers of high index material 18a, 19, 20 and 21 are staggered in that the outermost layer is the longest and succeeding layers are shorter. The ray of light passing through the lower portion of the polarizer will therefore traverse fewer layers of high and low index material than a ray passing through an upper portion. The structure shown in FIGURE 3 may be produced by masking the layers of titanium dioxide and the intervening lower index layers, which may comprise magnesium fluoride, during the process of their deposition. As successive layers are applied the mask is moved, thus providing the step for gradient density of the polarized area illustrated.

Another method of producing a gradient density polarizer is shown in FIGURE 5. In this embodiment 26 and 27 indicate high index layers separated by the layers of some low index material 28. It will be observed that the high index layers 26, 27, are of increased thickness from the bottom to their tops as shown. The thickness of the layers 26, 27, are of the order of a fraction of a wave length of light, for example, by way of illustration and not by way of limitation, there is shown a coating of ⅛ the thickness of wave length of yellow light, at the bottom of FIGURE 5, while the upper portion of FIGURE 5 shows a thickness of ½ the wave length of light.

The thickness of the high index layers, due to interference phenomena governs the reflectivity of the layer with respect to the vertical component of the light incident thereon. The vertical component is that portion of he light which is hereinabove referred to as the specular glare from light reflected from horizontal surrounding objects and the road during daylight. It is also the light coming from oncoming car headlights which have been made to produce vertically polarized light by the use of suitable light polarizing structures attached thereto.

In order to not materially effect the resolution of the image transmitted by the windshield it is essential for the proper operation of the present invention that the thickness "T" between the layers of the high index material be sufficiently small to minimize the separation between successively reflected transmitted rays.

However, if the thickness "T" of the light polarizing structure is decreased to a thickness of the order of a wave length of yellow light the result is similar to that of the well known dichroic mirror which transmits and reflects complementary colors of the light. Such a structure distorts the color of the transmitted image. This change in color in a windshield would be objectionable since it affects the colors of the scene being viewed. I have found that it is possible to avoid the dichroic reflection and refraction characteristics of closely spaced transparent reflective films while at the same time providing a sufficiently thin structure to achieve good image resolution. This structure may be laminated between sheets of glass using a safety type lamination such as the plasticized polyvinyl butyral interlayer or other such "safety" lamination. It will be seen that the distance "T" between the high index layers is thus a critical factor in the present invention. The distance "T" should be sufficiently large to avoid dichroic effects and yet small enough to maintain the separation $\delta$ between the successively reflected transmitted rays 18, 18' necessary for acceptable image resolution. While the distance "T" may vary it has been found necessary to limit "T" to a range of from 3 to 25 wave lengths or, approximately 0.5 to 10 times $10^{-4}$ inch.

The failure to recognize these critical thickness requirements and the absence of a structure which would overcome visual and color distortion of the heretofore known multi-layer light polarizing devices has been the reason for their inadequacy particularly in the field of headlight glare eliminating structures.

In FIGURE 4 there is shown the various paths resulting from the passage of the incident ray 11, through a multi-layer polarizer made in accordance with the present invention. This figure will further illustrate the importance of preserving the optical perfection of the transmitted image by controlling the thickness of the entire polarizing structure. Where multi-layer coatings are produced in which the reflecting high index layers indicated at 30 in FIGURE 4, are separated by a considerable thickness "T," the incident ray 11 is broken up into a series of reflected rays within the structure as shown at 31, 32 and 33. Some of these rays comprise reflected components as indicated at 17 and 34 and certain portions of the internally reflected rays are again transmitted to the observer as indicated by ray 18'.

The resulting multiple transmitted rays 18, 18' have a separation $\delta$. It is essential for the proper operation of a multi-layer polarizing windshield that the separation $\delta$ be reduced to a degree which will not cause distortion of the image viewed through the windshield.

The interlayers 22, 23, 24 are preferably made of extremely thin sheets of glass or transparent glass coatings. Such coatings may be applied in the form of a suspension of dispersed glass in an organic solvent which may be flowed, sprayed, or spun on the glass surfaces, to form a uniform layer thereon. Thereafter, heat is applied to evaporate the solvent and fuse the glass to a layer of desired thickness. Flow and surface tension during the molten stage provides a smooth glazed appearance well known to the ceramic or glass art. This layer of glass is deposited over a previously applied layer of titanium dioxide and another layer of titanium dioxide may be deposited upon the glass layer so formed. Additional layers may be applied in this manner to produce the desired multi-layer polarizing structure.

The wedge shaped coatings 26, 27, shown in FIGURE 5, may be produced by vacuum coatings during which the shield is continuously moved so that one portion of the film gets a greater exposure than the adjacent portion.

In using a multi-layer light polarizing windshield in accordance with the present invention it will be necessary for the driver to adjust the level of his eyes to be approximately in line with the central portion of the gradient density polarizing structure. This adjustment can be made initially by raising or lowering the seat of the vehicle which is being driven. Thereafter, the normal raising or lowering of his eyes in viewing distant and nearby objects will cause him to look through the upper or lower portion of the windshield and give him complete protection from road glare or the glare of oncoming headlights while at the same time affording him complete visibility where required.

By using titanium dioxide coatings and other materials which are not affected by exposure to heat or sunlight the multi-layer polarizer hereindescribed will withstand extreme conditions of use such as prolonged exposure to sun and heat as well as cold during the normal use of the vehicle. Since the thickness of the multi-layer polarizer is of necessity held to a minimum, the structure lends itself to incorporation within presently known windshield laminations. The manner in which the layers are built upon the glass of the windshield permits a wide variety of patterns which may be adapted to the conditions under which the vehicle will be driven so as to provide the maximum amount of glare free protection.

Having thus fully described the invention, what is claimed as new and desired to be secured by Letters Patent of the United States is:

1. A multi-layer light polarizing structure for disposition substantially at Brewster's angle with respect to light rays passing therethrough comprising, alternate layers of high and low index solid materials, the high index layers being deposited in successive bands of decreasing width to form a gradient light polarizing structure, said low index layers having a thickness not less than 0.5 and not more than 12 times one ten thousandths of an inch, said structure being disposed substantially at Brewster's angle.

2. A multi-layer polarizing vehicle windshield structure for disposition substantially at Brewster's angle with respect to light rays passing therethrough comprising a plurality of sheets of transparent low index solid material having a thickness of not less than 0.5 and not more than 12 times one ten thousandths of an inch and a layer of a transparent high index solid material alternately disposed with said sheets, said layers being deposited in successive bands of decreasing height to form a gradient light polarizing structure, the whole forming a solid unitary structure, said structure being disposed substantially at Brewster's angle.

3. A multi-layer light polarizing structure for disposition substantially at Brewster's angle with respect to light rays passing therethrough comprising, alternate layers of high and low index solid materials, the high index layers having an elongated wedge-shaped cross-section and forming a gradient light polarizing structure, said low index layers having a thickness not less than 0.5 and not more than 12 times one ten thousandths of an inch, said structure being disposed substantially at Brewster's angle.

4. A multi-layer light polarizing vehicle windshield structure for disposition substantially at Brewster's angle with respect to light rays passing therethrough comprising, a plurality of sheets of transparent low index solid material having a thickness of not less than 0.5 and not more than 12 times one ten thousandths of an inch, and a layer of transparent high index solid material alternately disposed with said sheets, said layers having an elongated wedge-shaped cross-section and forming a gradient light polarizing structure, the hole forming a solid unitary structure, said structure being disposed substantially at Brewster's angle.

References Cited in the file of this patent

UNITED STATES PATENTS

| | | |
|---|---|---|
| 1,734,022 | Short | Oct. 29, 1929 |
| 2,185,018 | Sauer | Dec. 26, 1939 |
| 2,237,565 | Land | Apr. 8, 1941 |
| 2,392,978 | Dimmick | Jan. 15, 1946 |
| 2,402,176 | Marks | June 18, 1946 |
| 2,403,685 | Sachtleben et al. | July 9, 1946 |
| 2,403,731 | MacNeille | July 9, 1946 |
| 2,433,503 | Young | Dec. 30, 1947 |
| 2,475,921 | Smith | July 12, 1949 |
| 2,519,545 | Colbert et al. | Aug. 22, 1950 |
| 2,624,238 | Widdop et al. | Jan. 6, 1953 |
| 2,852,980 | Schroder | Sept. 23, 1958 |

FOREIGN PATENTS

| | | |
|---|---|---|
| 592,177 | Great Britain | Sept. 10, 1947 |
| 1,028,899 | France | Mar. 4, 1953 |